(12) United States Patent
Duffy

(10) Patent No.: US 12,065,971 B2
(45) Date of Patent: Aug. 20, 2024

(54) CENTRIFUGALLY PUMPED FUEL SYSTEM

(71) Applicant: Raytheon Technologies Corporation, Arlington, VA (US)

(72) Inventor: Kevin M. Duffy, Hartford, CT (US)

(73) Assignee: Raytheon Technologies Corporation, Arlington, VA (US)

( * ) Notice: Subject to any disclaimer, the term of this patent is extended or adjusted under 35 U.S.C. 154(b) by 0 days.

(21) Appl. No.: 18/154,683

(22) Filed: Jan. 13, 2023

(65) Prior Publication Data

US 2024/0110519 A1 Apr. 4, 2024

Related U.S. Application Data

(60) Provisional application No. 63/378,045, filed on Sep. 30, 2022.

(51) Int. Cl.
*F02C 7/224* (2006.01)
*F02C 7/16* (2006.01)

(52) U.S. Cl.
CPC ............... *F02C 7/224* (2013.01); *F02C 7/16* (2013.01); *F05D 2260/213* (2013.01)

(58) Field of Classification Search
CPC .... F02C 3/16; F02C 7/22; F02C 7/224; F02C 7/16; F02C 9/26; F23R 3/38; F23R 3/52; F23R 3/343
See application file for complete search history.

(56) References Cited

U.S. PATENT DOCUMENTS

| 3,932,988 | A | | 1/1976 | Beaufrere | |
|---|---|---|---|---|---|
| 4,038,815 | A | * | 8/1977 | Heitmann | F23R 3/38 60/726 |
| 4,040,251 | A | * | 8/1977 | Heitmann | F02C 7/36 60/804 |
| 5,855,112 | A | * | 1/1999 | Bannai | F23R 3/44 60/39.511 |
| 6,293,338 | B1 | * | 9/2001 | Chapman | F28F 3/04 165/170 |
| 7,036,321 | B2 | | 5/2006 | Dudebout et al. | |
| 8,763,405 | B2 | * | 7/2014 | Sordyl | F02C 3/16 431/168 |
| 8,820,092 | B2 | * | 9/2014 | Thompson, Jr. | F01D 5/081 415/115 |
| 9,464,527 | B2 | * | 10/2016 | Thompson, Jr. | F01D 5/185 |
| 9,874,148 | B2 | * | 1/2018 | Patel | F02C 3/16 |

(Continued)

FOREIGN PATENT DOCUMENTS

| CA | 2921053 | C | * | 6/2020 | ............. F01D 13/02 |
| CN | 216910623 | U | * | 7/2022 | |

(Continued)

OTHER PUBLICATIONS

Extended European Search Report dated Feb. 13, 2024, for corresponding European Application No. 23200623.9.

*Primary Examiner* — Craig Kim

(74) *Attorney, Agent, or Firm* — Kinney & Lange, P.A.

(57) ABSTRACT

A fuel delivery system includes a central shaft extending along a central axis. The central shaft includes a fuel passage extending into the central shaft along the central axis. The fuel delivery system further includes a heat transfer volume radially outward from the central shaft and fluidically connected to the fuel passage. A combustor chamber is fluidically connected to the heat transfer volume.

19 Claims, 7 Drawing Sheets

(56) References Cited

U.S. PATENT DOCUMENTS

| | | | | |
|---|---|---|---|---|
| 9,903,214 B2 * | 2/2018 | Kenyon | ............... | B23K 26/342 |
| 11,732,606 B2 * | 8/2023 | Segawa | ..................... | F02C 6/12 |
| | | | | 415/177 |
| 2005/0229601 A1 * | 10/2005 | Thompson | .............. | F02C 7/224 |
| | | | | 60/772 |
| 2010/0212325 A1 * | 8/2010 | Condevaux | ............... | F23R 3/16 |
| | | | | 60/740 |
| 2014/0193274 A1 * | 7/2014 | Thompson, Jr. | ........ | F01D 5/185 |
| | | | | 416/97 R |
| 2023/0167788 A1 * | 6/2023 | Soto Carril | ............... | F02C 9/44 |
| | | | | 60/258 |
| 2023/0258131 A1 * | 8/2023 | Muldoon | ................ | F28D 7/106 |
| | | | | 60/772 |

FOREIGN PATENT DOCUMENTS

| | | | | |
|---|---|---|---|---|
| EP | 1001223 A2 * | 5/2000 | ............ | F01D 25/18 |
| EP | 1612371 B1 * | 7/2008 | ............. | B64D 41/00 |
| KR | 102268593 B1 | 6/2021 | | |
| WO | WO-2013151162 A1 * | 10/2013 | ................ | F02C 3/30 |
| WO | WO-2017139863 A1 * | 8/2017 | ............. | F01D 13/02 |

* cited by examiner

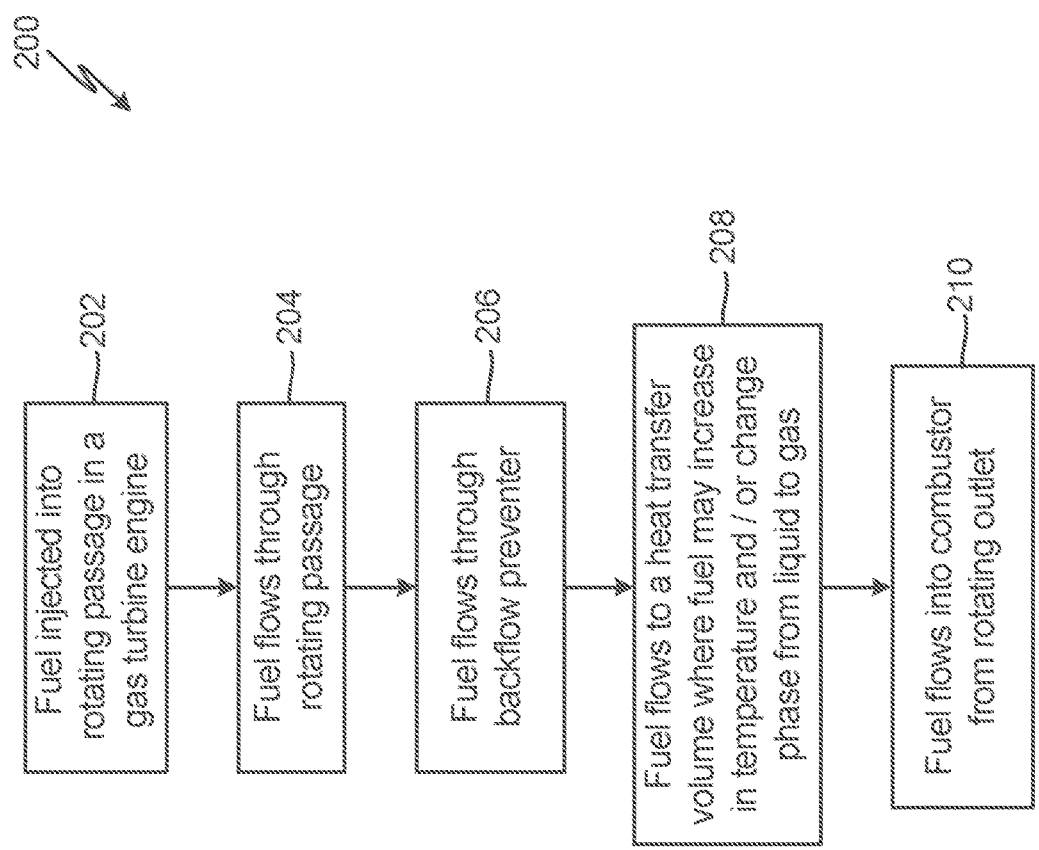

CENTRIFUGALLY PUMPED FUEL SYSTEM

BACKGROUND

The present disclosure relates to fuel delivery mechanisms for gas turbine engines. Gas turbine engines combust fuel to produce gaseous products and heat. The gaseous products and heat are harnessed to propel an aircraft. The fuel is combusted in a combustor within the gas turbine engine to produce the gaseous products and heat. A slinger combustor is a combustor design for gas turbine engines in which the fuel is injected into the combustor through a rotating fuel inlet. The fuel delivered to the combustor can be significantly below the volatilization temperature, reducing the potential energy extraction of the fuel in the Brayton Cycle of the gas turbine engine. Therefore, a fuel delivery mechanism which increases the energy of a fuel prior to combustion is desired.

SUMMARY

In one embodiment, a fuel delivery system includes a central shaft extending along a central axis. The central shaft includes a fuel passage extending into the central shaft along the central axis. The fuel delivery system further includes a heat transfer volume radially outward from the central shaft and fluidically connected to the fuel passage. A combustor chamber is fluidically connected to the heat transfer volume.

In another embodiment, a method of delivering fuel to a combustor of a gas turbine engine includes injecting fuel into a fuel passage via a fuel pump, where the fuel passage extends in a rotating central shaft and is coaxial with a central axis of the rotating central shaft. The method further includes flowing the fuel from the fuel passage to a backflow preventer. The method further includes flowing the fuel from the backflow preventer into a heat transfer volume radially outward from the rotating central shaft. The heat transfer volume is physically connected to the rotating central shaft and rotates with the rotating central shaft. The method further includes transferring heat from a combustor to the heat transfer volume, where the heat converts the fuel to a gaseous fuel. The gaseous fuel then flows from the heat transfer volume to the combustor via a plurality of holes in the heat transfer volume. The gaseous fuel is then combusted in the combustor to produce heat and combustion gases.

In another embodiment a gas turbine engine includes a central shaft coaxial with a central axis, the central shaft includes a fuel passage extending axially within the central shaft. The gas turbine further includes a bearing assembly radially surrounding and rotatably connected to the central shaft, a compressor connected to the central shaft, and a compressor shroud connected to the bearing assembly and radially outward of the compressor. The gas turbine engine further includes a turbine connected to the central shaft, a turbine shroud radially outward of the turbine, and a heat transfer volume axially between the compressor and the turbine. The heat transfer volume is rotationally connected to the central shaft. The gas turbine engine further includes a backflow preventer radially between the central shaft and the heat transfer volume and fluidically connecting the fuel passage to the heat transfer volume. A combustion chamber is radially outward of the heat transfer volume.

BRIEF DESCRIPTION OF THE DRAWINGS

FIG. 7 is a flow diagram of another method of operating the gas turbine engine of FIG. 1.

DETAILED DESCRIPTION

This disclosure relates to a gas turbine engine including a fuel passage through a central shaft and a heat transfer volume. The fuel passage and heat transfer volume permits fuel to flow radially outward during rotation of the central shaft, utilizing the centrifugal force caused by the rotation of the gas turbine engine to move and pressurize the fuel. The heat transfer volume enables transfer of heat from a rotor, turbine, and/or a combustor of the gas turbine engine to the fuel. In this way the fuel can be used to cool the rotor, turbine, and/or combustor which may allow for those parts to operate below their maximum temperature limits. The heat added to the fuel can volatilize the fuel in the heat transfer volume, and may cause it to vaporize increasing the enthalpy of the fuel. A vaporized fuel with increased enthalpy does not require energy from the combustion process to vaporize the fuel and therefore the efficiency of the combustion process is increased. The heat transfer volume directs the volatilized fuel into the combustor for combustion.

Figure 1:
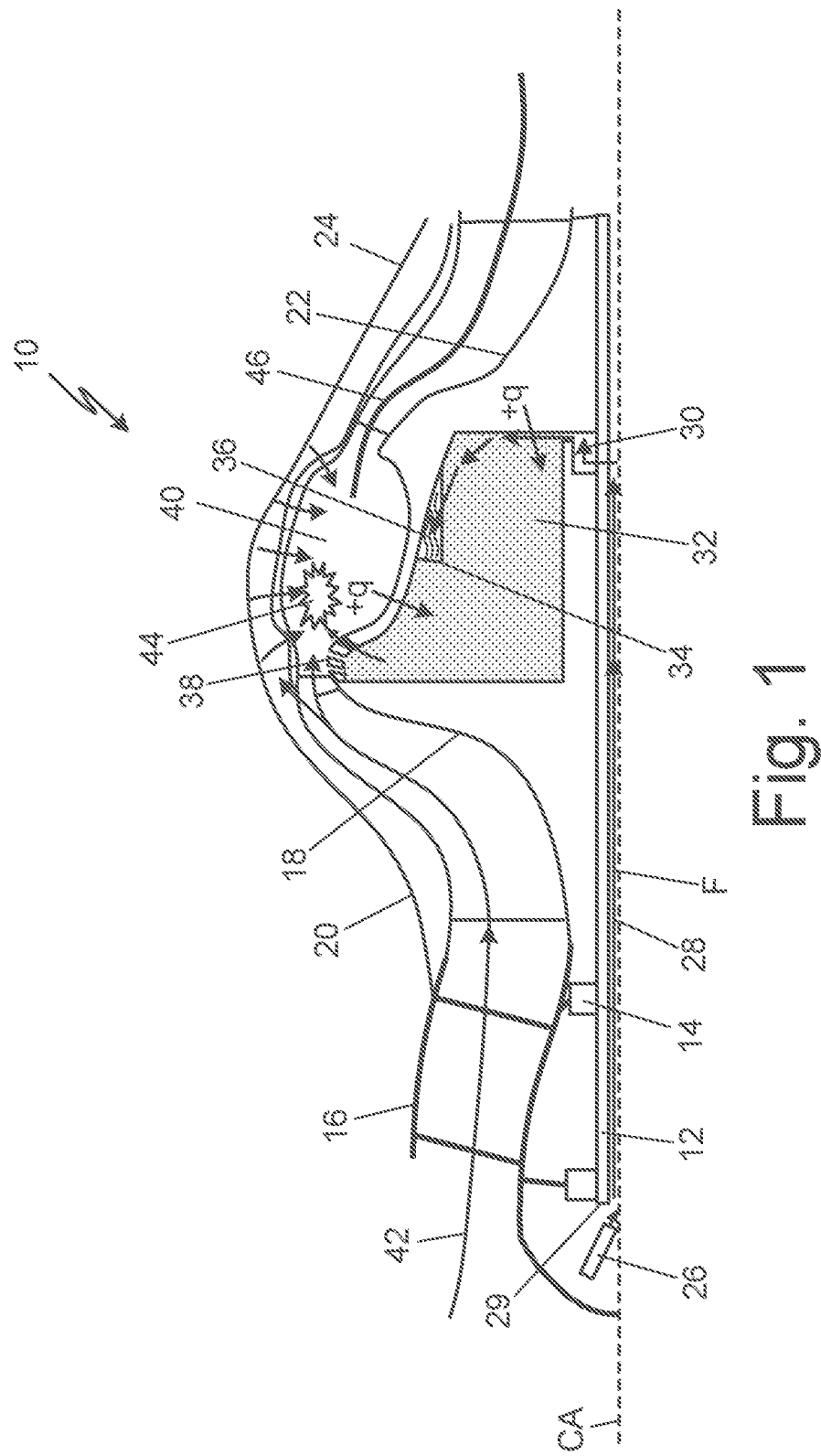
FIG. 1 is a half cross-sectional schematic view of an embodiment of a gas turbine engine with a heat transfer volume.
Figure 2:
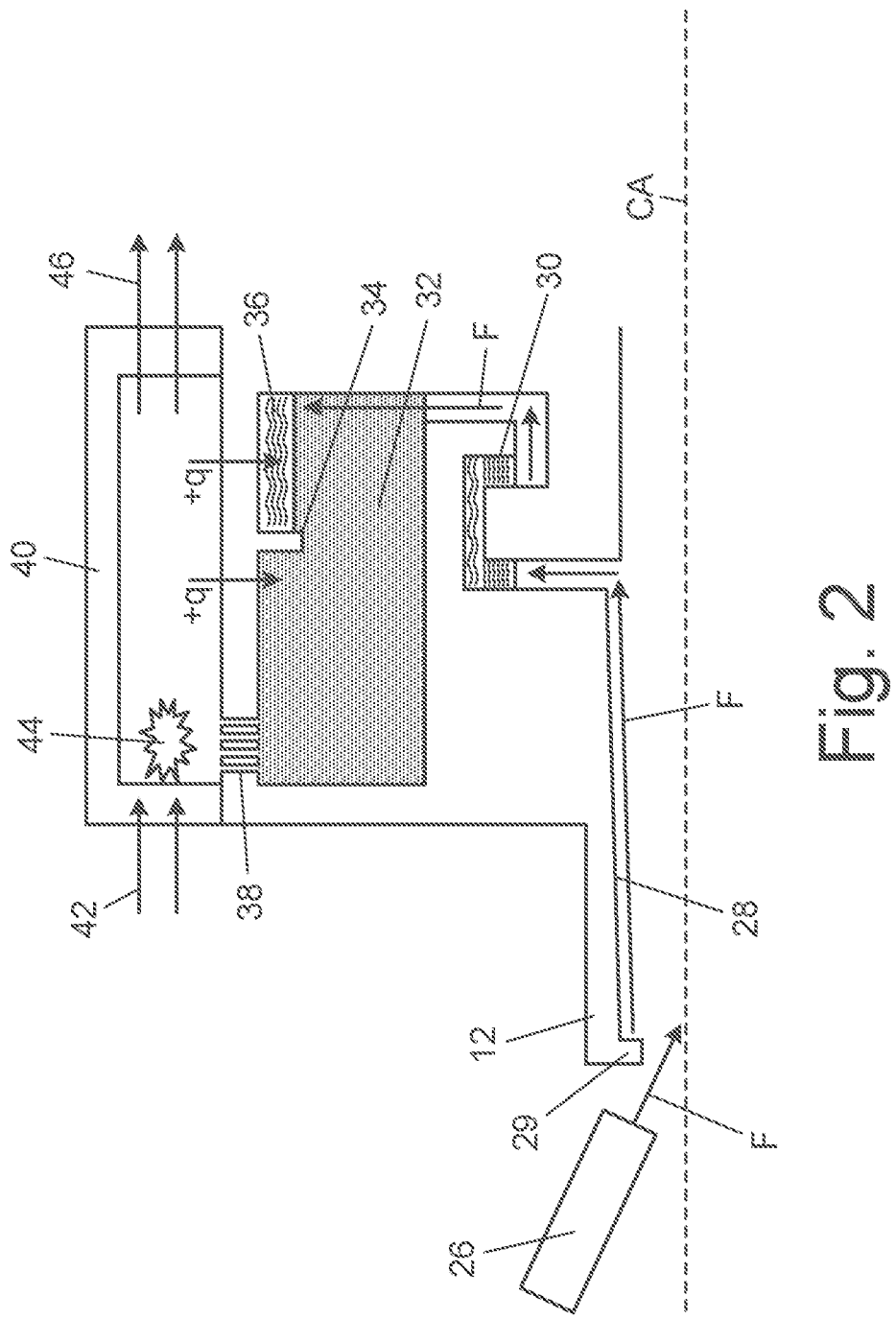
FIG. 2 is a half cross-sectional schematic view of an embodiment of a heat transfer volume.

FIGS. 1 and 2 will be discussed concurrently. FIG. 1 is a half cross-sectional schematic view of an embodiment of gas turbine 10 with heat transfer volume 32. FIG. 2 is a half cross-sectional schematic view of another embodiment of heat transfer volume 32. As illustrated in FIGS. 1 and 2, gas turbine 10 includes central shaft 12, bearing 14, support structure 16, compressor rotor 18, compressor shroud 20, turbine rotor 22, turbine shroud 24, fuel nozzle 26, fuel passage 28, backflow preventer 30, heat transfer volume 32, fuel retention weir 34, catchment basin 36, holes 38, combustor 40, inlet air 42, combustion region 44, combustion gas 46, and central axis CA.

Gas turbine 10 is a gas turbine engine which compresses inlet air 42, adds fuel F to compressed inlet air 42 in combustor 44, and ignites the fuel F and compressed inlet air 42 to produce heat and combustion gas 46. Combustion gas 46 is directed across turbine rotor 22 and is significantly expanded to turn turbine rotor 22. Gas turbine 10 can be attached to an aircraft to propel the aircraft.

Central shaft 12 extends along central axis CA of gas turbine 10. In the embodiment of FIG. 1, central shaft 12 is connected to both compressor rotor 18 and turbine rotor 22 such that rotation of turbine rotor 22 rotates central shaft 12 and compressor rotor 18. During startup of gas turbine 10, a starter motor can rotate central shaft 12. The starter motor rotates central shaft 12 to a sufficient rotation speed such that compressor rotor 18 can achieve a sufficient pressure to permit combustion to begin in combustor 40.

Bearing 14 can be connected to central shaft 12 on a radially inner side of bearing 14 and can be connected to support structure 16 on a radially outer side of bearing 14. Bearing 14 connects central shaft 12 to support structure 16 while permitting central shaft 12 to rotate freely while support structure 16 can be fixed. Bearing 14 radially and axially constrains central shaft 12 to central axis CA. Support structure 16 can be an attachment point for gas turbine 10 to the aircraft.

As central shaft 12 rotates about central axis CA, compressor rotor 18 rotates. Compressor rotor 18 can be positioned axially between support structure 16 and heat transfer volume 32. Compressor rotor 18 can be connected to central shaft 12. Compressor rotor 18 can be radially between central shaft 12 and compressor shroud 20. As compressor rotor 18 rotates, compressor rotor 18 intakes inlet air 42 and compresses inlet air 42 to a higher temperature and pressure. Compressor rotor 18 can have a plurality of compressor blades extending from a hub of compressor rotor 18. Compressor rotor 18 can be radially surrounded by compressor shroud 20. Compressor shroud 20 can extend axially between support structure 16 and turbine shroud 24. Compressor shroud 20 can form a radially outer flow surface that directs inlet air 42 into combustor 40.

Turbine rotor 22 receives the hot and expanding combustion gas 46 from combustor 40 after combustion of the fuel F in combustion region 44. Turbine rotor 22 can be axially between heat transfer volume 32 and an exhaust of gas turbine 10. Turbine rotor 22 can be connected to central shaft 12. Turbine rotor 22 can be radially between central shaft 12 and turbine shroud 24. Turbine rotor 22 is rotated by kinetic energy from the combustion gas 46 via a plurality of turbine rotor blades. As turbine rotor 22 rotates, turbine rotor 22 rotates central shaft 12 which drives compressor rotor 18 to compress inlet air 42. Turbine shroud 24 extends around turbine rotor 22 and forms a radially outer gas path surface that guides combustion gas across turbine rotor 22. Turbine shroud 24 can be axially between compressor shroud 20 and the exhaust of gas turbine 10.

A fuel pump (not shown) pumps fuel F from a storage tank on the aircraft to fuel nozzle 26. After reaching fuel nozzle 26, fuel F is injected by fuel nozzle 26 into inlet 29 of fuel passage 28. After fuel F enters inlet 29 of fuel passage 28 in central shaft 12, centrifugal force generated by rotation of central shaft 12 causes fuel F to flow within fuel passage 28. Fuel passage 28 extends axially through central shaft 12 to backflow preventer 30. A radially outward port in central shaft 12 fluidically connects fuel passage 28 to backflow preventer 30. In the embodiments shown in FIGS. 1 and 2, fuel passage 28 forms a bore extending axially through a center of central shaft 12 along central axis CA. In alternative embodiments, fuel passage 28 can be parallel with central axis CA and run through a region between a center of central shaft 12 and a radially outer surface of central shaft 12. In the embodiments shown in FIGS. 1 and 2, there is a single fuel passage in central shaft 12 that defines fuel passage 28. The fuel F is moved through fuel passage 28 by centrifugal force generated by rotating central shaft 12 which act on the fuel F. The centrifugal force applies a radially outward force on the fuel F which can be significantly greater than the force of gravity. In the embodiment of FIGS. 1 and 2, fuel passage 28 can gradually taper radially outward from inlet 29 to backflow preventer 30. The radially outward taper provides a slope and a direction of least resistance inside fuel passage 28, thereby causing the centrifugal force acting on fuel F to direct fuel F toward the radially outward port and backflow preventer 30.

Backflow preventer 30 prevents a backwards flow of fuel F out of heat transfer volume 32. As shown in FIGS. 1 and 2, backflow preventer 30 can be radially between central shaft 12 and heat transfer volume 32. Backflow preventer 30 can axially be anywhere which enables backflow preventer 30 to be connected to fuel passage 28 and heat transfer volume 32. Backflow preventer 30 can include a serpentine passage that causes fuel F to completely fill at least a portion of the serpentine passage to prevent vaporized fuel from backflowing out of heat transfer volume 32 during operation of gas turbine 10. Backflow preventer 30 may also prevent fuel from flowing out of heat transfer volume 32 when the centrifugal force acting on central shaft 12 and heat transfer volume 32 decrease, such as during a shutdown of gas turbine 10. An embodiment of backflow preventer 30 is discussed with regards to FIG. 3. Those of skill in the art may contemplate alternative embodiments of backflow preventers. In alternative embodiments, one of skill in the art may contemplate removing the backflow preventer 30 and directly connecting fuel passage 28 to heat transfer volume 32.

In the embodiments of FIGS. 1 and 2, heat transfer volume is connected to an outlet of backflow preventer 30. In this embodiment the heat transfer volume 32 is a chamber where fuel F accumulates during operation of gas turbine 10 and increases in temperature and evaporates. Increasing the temperature of the fuel F prior to transfer into combustor 40 reduces the consumption of useful energy to volatize the fuel inside combustor 40. The temperature of the fuel F in heat transfer volume 32 can be increased using heat from combustor 40. The heat from the combustion of the fuel F in combustor 40 can be transferred via conduction, convection and/or radiation into heat transfer volume 32 to heat and vaporize fuel F.

In the embodiment of FIG. 2, heat transfer volume 32 can be a hollow annular cylinder which is axisymmetric about central axis CA. As shown in the embodiment of FIG. 1, heat transfer volume 32 can be substantially flat on each radially extending end wall and substantially cylindrically shaped on a radially inner wall that extends between the radially extending end walls. In alternative embodiments the end walls can be curved, and the radially inner wall of heat transfer volume 32 can curve between the end walls. As shown in the embodiment of FIG. 1, the radially outer wall of heat transfer volume 32 can curve between the end walls, with a region nearest to compressor rotor 18 being the radially outermost portion. Alternatively, the radially outer wall of heat transfer volume 32 can be substantially cylindrically shaped between the axial walls. Heat transfer volume 32 is enclosed by the radially outer wall, the radially inner wall, and the two radially extending end walls. The radially inner wall of heat transfer volume 32 can be formed from compressor rotor 18 and the radially outer wall of heat transfer volume 32 can be formed from turbine rotor 22. Alternatively, heat transfer volume 32 can be formed separately from compressor rotor 18 and turbine rotor 22 and placed axially between compressor rotor 18 and turbine rotor 22.

Within heat transfer volume 32 can be weir 34. Weir 34 can be formed of a radially inward projection formed on a radially inner surface of the radially outer wall of heat transfer volume 32. Weir 34 can be an annular flange which is axisymmetric about central axis CA. As shown in FIG. 1, a cross section of weir 34 is rectangular which forms a ring around central axis CA. In alternative embodiments a cross-section or weir 34 can be a wedge, a semi-circle, or any other shape which can project from the radially inner surface of the radially outer wall of heat transfer volume 32. Catchment basin 36 can be formed by weir 34 and the radially outer wall. Catchment basin 36 is a basin which can hold the fuel F after the fuel F enters heat transfer volume 32 as a liquid and as the fuel F receives heat and volatizes. Catchment basin 36 can be axially near backflow preventer 30 such that fuel which flows through backflow preventer 30 will flow radially outward and land into catchment basin 36.

The plurality of holes 38 are formed through the radially outer wall of heat transfer volume 32. Holes 38 permit fuel F which has been volatilized in heat transfer volume 32 to flow into combustor 40. Holes 38 can be circumferentially distributed about the central axis to form a ring of holes in the radially outer wall of heat transfer volume 32. Alternatively, holes 38 can be placed in groups which are circumferentially distributed on the radially outer wall about the central axis CA to form hole groups in the radially outer wall of heat transfer volume 32. Holes 38 can be formed on an opposite axial end of heat transfer volume 32 from backflow preventer 30. Further, holes 38 can be formed radially outward from weir 34 and catchment basin 36. For example, holes 38 can be formed in the radially outermost portion of the radially outer wall of heat transfer volume 32 (as shown in FIG. 1) such that the fuel F in the heat transfer volume 32 will be guided to holes 38 when heat transfer volume 32 is rotating and centrifugal force is acting on the fuel F. Forming holes 38 axially nearest to compressor rotor 18 and radially outward from weir 34 and catchment basin 36 enables the fuel F to enter heat transfer volume 32 through backflow preventer 30, be held in catchment basin 36 until volatilization, and travel to holes 38 as volatilized fuel F which can be a region of heat transfer volume 32 with the highest apparent centrifugal force. Due to the centrifugal force acting on the fuel F, and the flowrate of the fuel F exiting out of holes 38 will be sufficiently high to overcome the pressure of the compressed air inside combustor 40 without the assistance of a boost pump.

Combustor 40 is positioned radially outward of heat transfer volume 32. Combustor 40 can axially be the same length as heat transfer volume 32. A radially inner wall of combustor 40 can be formed by the radially outer wall of heat transfer volume 32. During operation, within combustor 40 the fuel F can be mixed with incoming air 42 and ignited in combustion region 44 to form combustion gas 46. The fuel F can be ignited by an ignitor or the fuel can be ignited by an already proceeding combustion process. Incoming air 42 can be compressed by compressor rotor 18 prior to entering combustor 40. After combusting in combustion region 44, combustion gas 46 exits combustor 40 and expands across turbine rotor 22. As such, combustion gas 46 is at a greater volume, temperature, and pressure than inlet air 42 and turbine 22 will extract some of the kinetic energy from combustion gas 46.

Combustion gas 46 can be used to provide jet thrust if the aircraft is a turbojet. Alternatively, combustion gas 46 can be directed through a secondary turbine to drive a propeller if the aircraft is a turboprop. Alternatively, the rotational energy of central shaft 12 can drive a fan in front of compressor rotor 18 to provide the thrust if the aircraft is a turbofan. Those of skill in the art may contemplate alternative methods to harness the energy derived in combustion of the fuel F.

Figure 3:
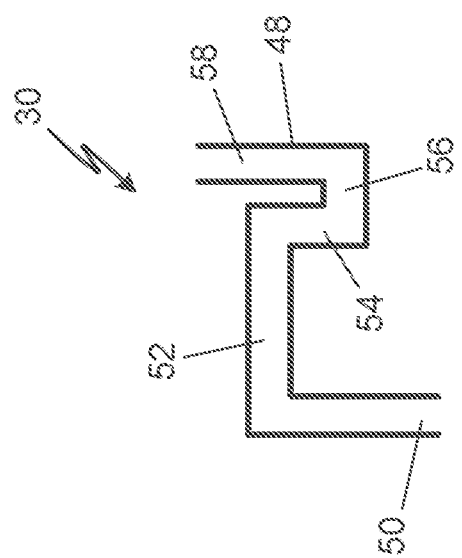
FIG. 3 is a cross-sectional schematic view of a u-trap.

FIG. 3 illustrates an embodiment of backflow preventer 30. FIG. 3 is a cross-sectional schematic view of U-Trap 48. U-Trap 48 is an embodiment of backflow preventer 30 which is fixed-geometry and passive. U-Trap 48 comprises first portion 50 which extends radially directly outward, second portion 52 which extends axially parallel to central axis CA in a first direction, third portion 54 which extends radially directly inwards, fourth portion 56 which extends axially parallel to central axis CA in the first direction, and fifth portion 58 which extends radially directly outward. During operation, the fuel F flows from fuel passage 28 into first portion 50. Once fuel F has flowed into first portion 50, fuel F enters second portion 52 and third portion 54 and completely fills third portion 54. After filling third portion 54, fuel F will flow into fourth portion 56 and fifth portion 58 and then into heat transfer volume 32.

Figure 4:
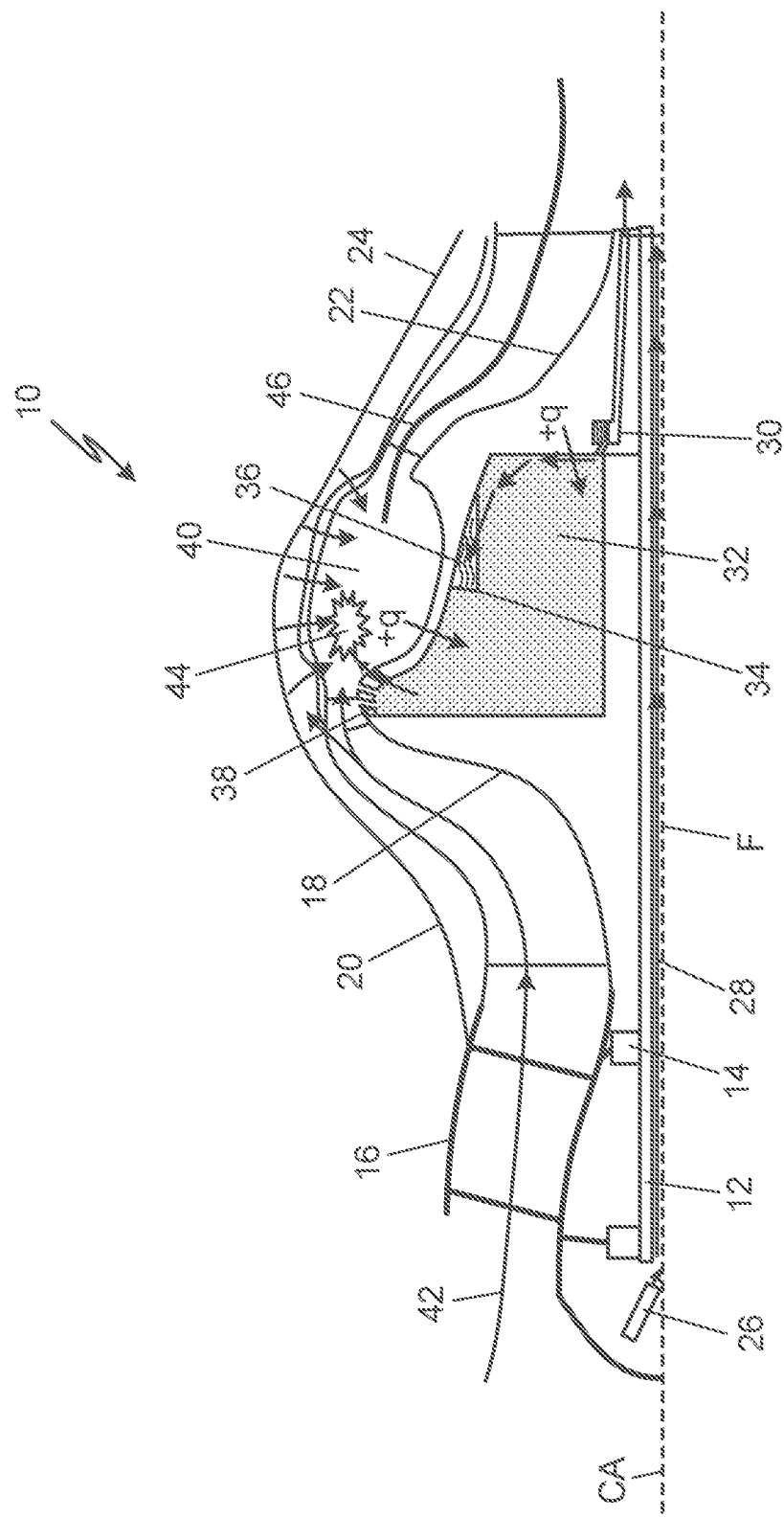
FIG. 4 is a half cross-sectional schematic view of a second embodiment of a gas turbine engine with a heat transfer volume.

FIG. 4 is a half cross-sectional schematic view of a second embodiment of gas turbine engine 10 with heat transfer volume 32. As illustrated in FIG. 4, gas turbine 10 includes central shaft 12, bearing 14, support structure 16, compressor rotor 18, compressor shroud 20, turbine rotor 22, turbine shroud 24, fuel pump 26, fuel passage 28, backflow preventer 30, heat transfer volume 32, fuel retention weir 34, catchment basin 36, holes 38, combustor 40, inlet air 42, combustion region 44, combustion gas 46, and central axis CA. Central shaft 12, bearing 14, support structure 16, compressor rotor 18, compressor shroud 20, turbine rotor 22, turbine shroud 24, fuel pump 26, backflow preventer 30, heat transfer volume 32, fuel retention weir 34, catchment basin 36, holes 38, combustor 40, inlet air 42, combustion region 44, combustion gas 46, and central axis CA are substantially as described in FIG. 1. Fuel passage 28 of FIG. 4 extends axially through central shaft 12 from fuel nozzle 26 through a first end to a second end of turbine rotor 22. At the second end of turbine rotor 22, fuel passage 28 extends radially outward and extends from the second end back to the first end through turbine rotor 22. By extending through turbine rotor 22, the fuel F can absorb some waste heat from turbine rotor 22. The fuel F acts as a coolant, removing waste heat from turbine rotor 22 and heating the fuel F. Heating the fuel F can decrease a length of time in catchment basin 36 prior to volatilization.

Figure 5:
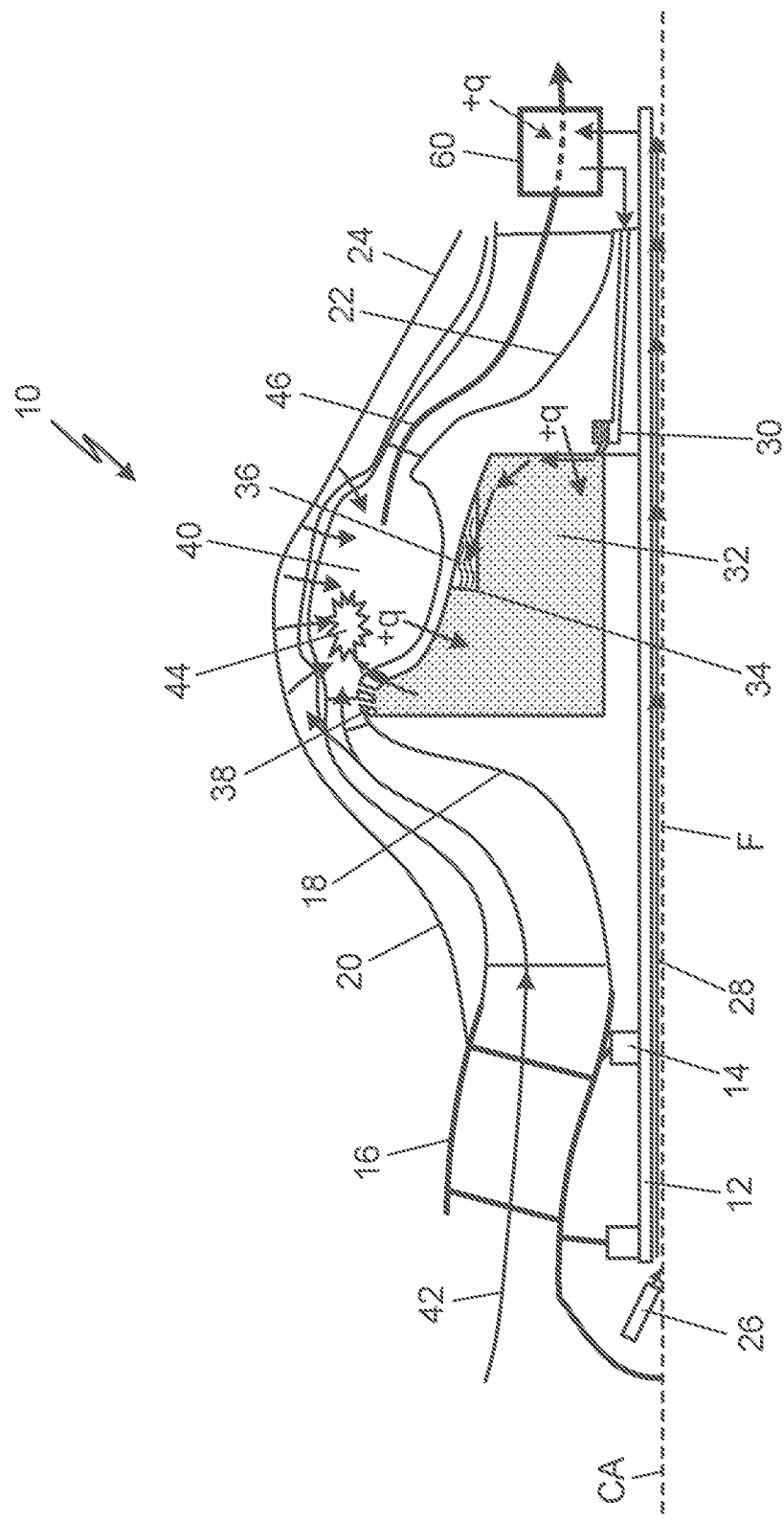
FIG. 5 is a half cross-sectional schematic view of a second embodiment of a gas turbine engine with a heat transfer volume.

FIG. 5 is a half cross-sectional schematic view of another embodiment of gas turbine engine 10 with heat transfer volume 32. The embodiment of gas turbine 10 in FIG. 5 is similar to the embodiment of gas turbine 10 in FIG. 4 with the addition of heat exchanger 60. Heat exchanger 60 is positioned within a core flow path of gas turbine 10 downstream of combustor 40. Heat exchanger 60 is fluidly connected to fuel passage 28 and heat transfer volume 32 such that fuel F passes into heat exchanger 60 from fuel passage 28 before the fuel F enters heat transfer volume 32. During operation, combustion gas 46 exhausts from combustor 40 and passes through or over heat exchanger 60. Heat is absorbed from combustion gas 46 by the fuel F in heat exchanger 60. Heating the fuel F allows the fuel F to more readily and speedily volatilize inside heat transfer volume 32. Heating the fuel F also cools combustion gas 46, which extends the life of gas turbine engine 10.

Figure 6:
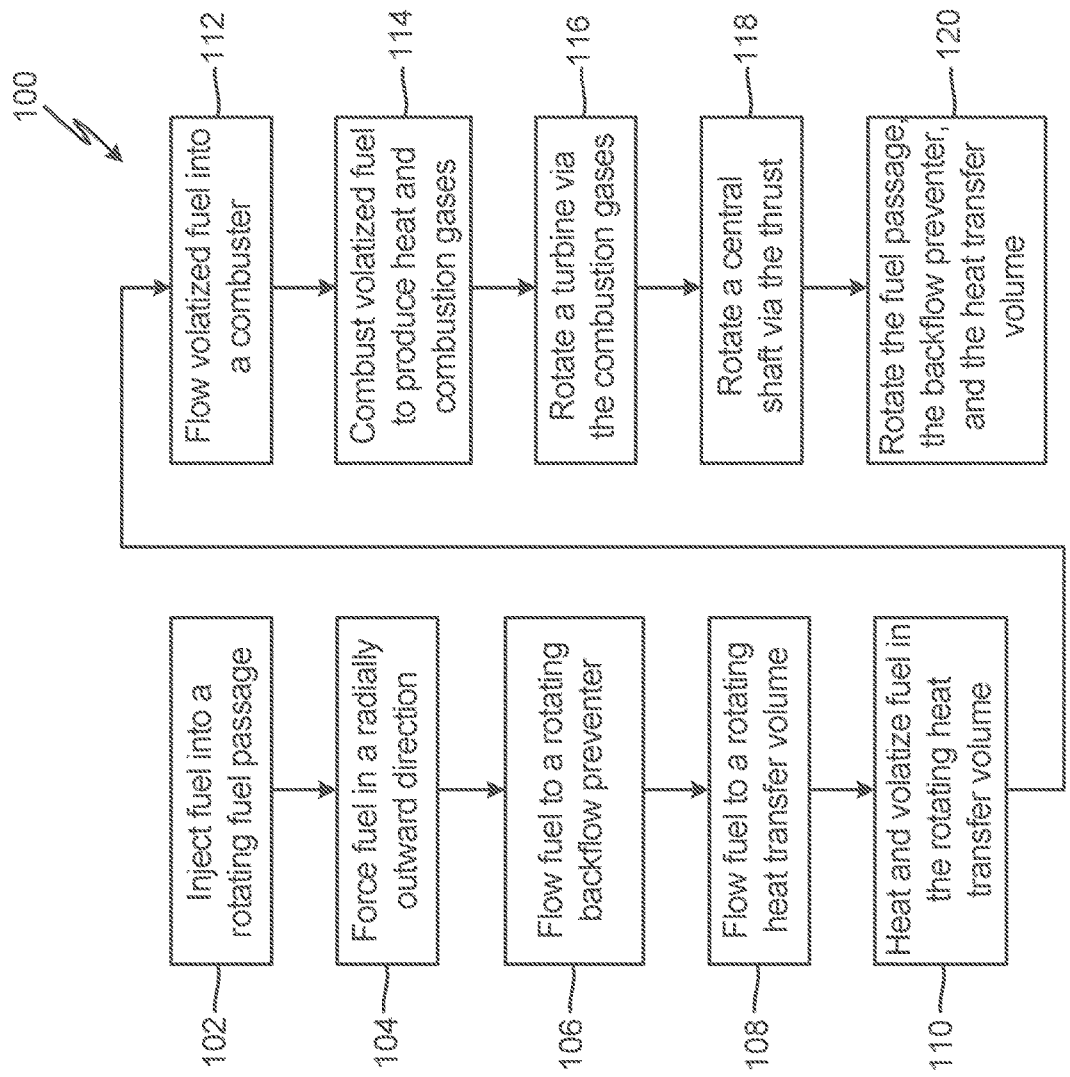
FIG. 6 is a flow diagram of a method of operating the gas turbine engine of FIG. 1.

FIG. 6 is a flow diagram of a fuel delivery method 100 for gas turbine engine 10 of FIG. 1. As illustrated in FIG. 6, the fuel delivery method includes first step 102 through tenth step 120. First step 102 includes injecting fuel F into rotating fuel passage 28. The fuel F can be injected into fuel passage 28 through fuel nozzle 26 fluidically connected to a fuel pump. As described above with reference to FIG. 1, fuel passage 28 can be in central shaft 12. Second step 104 comprises forcing the fuel F in a radially outward direction. The fuel F can be forced in a radially outward direction by spinning central shaft 12 such that centrifugal force caused by the spinning of central shaft 12 act on the fuel F. Fuel passage 28 can taper radially outward as fuel passage 28 extends in an axial direction to accentuate the fuel flow caused by the centrifugal force.

Third step 106 comprises flowing the fuel F to rotating backflow preventer 30. The fuel F can be flowed to rotating backflow preventer 30 through fuel passage 28 as described in second step 104. Fuel passage 28 can pass through turbine rotor 22 prior to connecting to backflow preventer 30 to enable waste heat to be drawn from turbine rotor 22 into the fuel F. Passing fuel passage 28 through turbine rotor 22 can increase a temperature of the fuel F prior to entering heat transfer volume 32, which can decrease a time for the fuel F to volatilization in heat transfer volume 32. Fourth step 108 comprises flowing the fuel F to rotating heat transfer volume 32 through backflow preventer 30 which ensures the fuel F only flows in a radially outward direction. Fifth step 110 comprises heating and volatizing the fuel F in rotating heat transfer volume 32. Once the fuel F enters heat transfer volume 32, the fuel F will be held behind weir 34 in catchment basin 36 and will begin receiving heat from turbine rotor 22 and combustor 40. Once the fuel F receives enough heat, the fuel F will volatize from a liquid to a gas.

Sixth step 112 comprises flowing the volatilized fuel F into combustor 40. Once the fuel F has been volatilized, the volatilized fuel F flows through holes 38 into combustor 40. Holes 38 can be formed through a radially outer wall of heat transfer volume 32 in a radially outermost region. Seventh step 114 comprises combusting the volatilized fuel F to produce heat and combustion gases. Once the volatilized fuel flows through holes 38 into combustor 40, the volatilized fuel F can be mixed and combusted with inlet air 42 in combustion region 44 to produce heat and combustion gases which form combustion gas 46. The volatilized fuel F can be ignited by an ongoing combustion process, and/or the volatilized fuel F can be ignited by an ignitor. Eighth step 116 comprises rotating turbine rotor 22 via the combustion gases. The combustion gases produced in combustion region 44 then flow from combustor 40 into turbine rotor 22. Turbine rotor 22 can then be rotated by combustion gas 46. Turbine rotor 22 can be rotated clockwise or counterclockwise depending on an orientation of the plurality of blades on turbine rotor 22.

Ninth step 118 comprises rotating central shaft 12 via turbine rotor 22. Since turbine rotor 22 is connected to central shaft 12, as turbine rotor 22 rotates central shaft 12 will likewise rotate. Tenth step 120 comprises rotating fuel passage 28, backflow preventer 30, and heat transfer volume 32. Since fuel passage 28, backflow preventer 30, and heat transfer volume 32 are connected to central shaft 12, as turbine rotor 22 rotates, central shaft 12 and the components connected to central shaft 12 are likewise rotated. The rotation of central shaft 12 creates a apparent centrifugal force on all of the components which drives the fuel F through fuel passage 28, backflow preventer 30, and heat transfer volume 32.

FIG. 7 is a flow diagram of another fuel delivery method 200 for gas turbine engine 10 of FIG. 1. As illustrated in FIG. 7, the fuel delivery method 200 includes first step 202 through fifth step 210. First step 202 includes injecting fuel F into rotating fuel passage 28 in gas turbine 10. The fuel F can be injected into fuel passage 28 through fuel nozzle 26 fluidically connected to a fuel pump. As described above with reference to FIG. 1, fuel passage 28 can be in central shaft 12. Second step 204 comprises flowing the fuel F through rotating fuel passage 28. Fuel passage 28 can taper radially outward as fuel passage 28 extends in an axial direction to accentuate the fuel flow caused by the centrifugal force. Third step 206 comprises flowing the fuel F through backflow preventer 30. Fourth step 208 comprises flowing the fuel F to heat transfer volume 32 where the fuel F may increase in temperature and/or change phase from a liquid to a gas. Fifth step 210 comprises flowing the fuel F into combustor 40 where the fuel F can be mixed and combusted with inlet air 42 in combustion region 44 to produce heat and combustion gases which form combustion gas 46.

Discussion of Possible Embodiments

The following are non-exclusive descriptions of possible embodiments of the present invention.

In one embodiment, a fuel delivery system includes a central shaft extending along a central axis. The central shaft includes a fuel passage extending into the central shaft along the central axis. The fuel delivery system further includes a heat transfer volume radially outward from the central shaft and fluidically connected to the fuel passage. A combustor chamber is fluidically connected to the heat transfer volume.

The fuel delivery system of the preceding paragraph can optionally include, additionally and/or alternatively, any one or more of the following features, configurations and/or additional components:

- a backflow preventer fluidically between the fuel passage and the heat transfer volume and radially between the fuel passage and the heat transfer volume;
- the backflow preventer is a U-trap;
- a compressor rotor is connected to the central shaft;
- a turbine rotor is connected to the central shaft;
- the fuel passage tapers radially outward within the central shaft as the fuel passage extends from an inlet of the fuel passage to the backflow preventer;
- the heat transfer volume is annular and extends circumferentially about the central shaft and the fuel passage;
- liquid or gaseous fuel is flowed through a turbine to provide cooling to the turbine;
- gas turbine exhaust gases transfer heat to the liquid or gaseous fuel;
- a plurality of holes fluidly connects the heat transfer volume to the combustion chamber;
- the heat transfer volume further comprises a fuel retention weir, wherein the fuel retention weir extends radially inward from a radially inner surface of the radially outer wall of the heat transfer volume;
- the fuel retention weir extends circumferentially about the central axis; and/or
- the plurality of holes is radially outward from the fuel retention weir and a catchment basin formed by the fuel retention weir inside of the heat transfer volume.

In another embodiment, a method of delivering fuel to a combustor of a gas turbine engine includes injecting fuel into a fuel passage via a fuel pump, where the fuel passage extends in a rotating central shaft and is coaxial with a central axis of the rotating central shaft. The method further includes flowing the fuel from the fuel passage to a backflow preventer. The method further includes flowing the fuel from the backflow preventer into a heat transfer volume radially outward from the rotating central shaft. The heat transfer volume is physically connected to the rotating central shaft and rotates with the rotating central shaft. The method further includes transferring heat from a combustor to the heat transfer volume, where the heat converts the fuel to a gaseous fuel. The gaseous fuel then flows from the heat transfer volume to the combustor via a plurality of holes in the heat transfer volume. The gaseous fuel is then combusted in the combustor to produce heat and combustion gases.

The method of the preceding paragraph can optionally include, additionally and/or alternatively, any one or more of the following features, configurations and/or additional components:

directing the combustion gases to a turbine, wherein the turbine is connected to the central shaft; and rotating, via the turbine, the central shaft about the central axis.

In another embodiment a gas turbine engine includes a central shaft coaxial with a central axis, the central shaft includes a fuel passage extending axially within the central shaft. The gas turbine further includes a bearing assembly radially surrounding and rotatably connected to the central shaft, a compressor connected to the central shaft, and a compressor shroud connected to the bearing assembly and radially outward of the compressor. The gas turbine engine further includes a turbine connected to the central shaft, a turbine shroud radially outward of the turbine, and a heat transfer volume axially between the compressor and the turbine. The heat transfer volume is rotationally connected to the central shaft. The gas turbine engine further includes a backflow preventer radially between the central shaft and the heat transfer volume and fluidically connecting the fuel passage to the heat transfer volume. A combustion chamber is radially outward of the heat transfer volume.

The gas turbine engine of the preceding paragraph can optionally include, additionally and/or alternatively, any one or more of the following features, configurations and/or additional components:
a radially outer wall of the heat transfer volume forms a radially inner wall of the combustion chamber;
the fuel passage extends through the turbine; and/or
the heat transfer volume further comprises a plurality of holes extending through a radially outer wall of the heat transfer volume, the plurality of holes being distributed around a circumference of the heat transfer volume.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel delivery system comprising:
a central shaft extending along a central axis, the central shaft comprising:
a fuel passage extending into the central shaft along the central axis;
a heat transfer volume radially outward from the central shaft and fluidically connected to the fuel passage, the heat transfer volume comprising a plurality of holes extending through a radially outer wall of the heat transfer volume, the plurality of holes being distributed around a circumference of the heat transfer volume; and
a combustor chamber fluidically connected to the heat transfer volume.

2. The fuel delivery system of claim 1, further comprising:
a backflow preventer fluidically between the fuel passage and the heat transfer volume and radially between the fuel passage and the heat transfer volume.

3. The fuel delivery system of claim 2, wherein the backflow preventer is a U-trap.

4. The fuel delivery system of claim 1, wherein a compressor rotor is connected to the central shaft.

5. The fuel delivery system of claim 1, wherein a turbine rotor is connected to the central shaft.

6. The fuel delivery system of claim 1, wherein the fuel passage tapers radially outward within the central shaft as the fuel passage extends from an inlet of the fuel passage to the backflow preventer.

7. The fuel delivery system of claim 1, wherein the heat transfer volume is an annular chamber which extends circumferentially about the central shaft and the fuel passage.

8. The fuel delivery system of claim 1, wherein the heat transfer volume comprises a series of fluid passages through a turbine.

9. The fuel delivery system of claim 1, wherein the heat transfer volume comprises a heat exchanger downstream from the combustor chamber.

10. The fuel delivery system of claim 1, wherein liquid or gaseous fuel is flowed through a turbine to provide cooling to the turbine, and wherein gas turbine exhaust gases transfer heat to the liquid or gaseous fuel.

11. The fuel delivery system of claim 1, wherein a plurality of holes fluidly connects the heat transfer volume to the combustion chamber.

12. The fuel delivery system of claim 1, wherein the heat transfer volume further comprises a fuel retention weir, wherein the fuel retention weir extends radially inward from a radially inner surface of the radially outer wall of the heat transfer volume.

13. The fuel delivery system of claim 12, wherein the fuel retention weir extends circumferentially about the central axis.

14. The fuel delivery system of claim 12, wherein the plurality of holes is radially outward from the fuel retention weir and a catchment basin formed by the fuel retention weir inside of the heat transfer volume.

15. A method of delivering fuel to a combustor of a gas turbine engine comprising:
injecting fuel into a fuel passage via a fuel pump, wherein the fuel passage extends in a rotating central shaft and is coaxial with a central axis of the rotating central shaft;
flowing the fuel from the fuel passage to a backflow preventer;
flowing the fuel from the backflow preventer into a heat transfer volume radially outward from the rotating central shaft, wherein the heat transfer volume is physically connected to the rotating central shaft and rotates with the rotating central shaft;
transferring heat from a combustor to the heat transfer volume, wherein the heat converts the fuel to a gaseous fuel;
flowing the gaseous fuel from the heat transfer volume to the combustor via a plurality of holes extending through a radially outer wall of the heat transfer volume, wherein the plurality of holes being distributed around a circumference of the heat transfer volume; and
combusting the gaseous fuel in the combustor to produce heat and combustion gases.

16. The method of claim 15, further comprising:
directing the combustion gases to a turbine, wherein the turbine is connected to the central shaft; and
rotating, via the turbine, the central shaft about the central axis.

17. A gas turbine engine comprising:
a central shaft coaxial with a central axis, the central shaft comprising a fuel passage extending axially within the central shaft;

a bearing assembly radially surrounding and rotatably connected to the central shaft;

a compressor connected to the central shaft;

a compressor shroud connected to the bearing assembly and radially outward of the compressor;

a turbine connected to the central shaft;

a turbine shroud radially outward of the turbine;

a heat transfer volume axially between the compressor and the turbine, wherein the heat transfer volume is rotationally connected to the central shaft and comprises a plurality of holes extending through a radially outer wall of the heat transfer volume, the plurality of holes being distributed around a circumference of the heat transfer volume;

a backflow preventer radially between the central shaft and the heat transfer volume and fluidically connecting the fuel passage to the heat transfer volume; and a combustion chamber fluidly connected to the heat transfer volume.

18. The gas turbine of claim 17, wherein a radially outer wall of the heat transfer volume forms a radially inner wall of the combustion chamber.

19. The gas turbine of claim 17, wherein the fuel passage extends through the turbine.

\* \* \* \* \*